(12) United States Patent
Goi et al.

(10) Patent No.: US 8,449,431 B2
(45) Date of Patent: May 28, 2013

(54) AIRCRAFT ELECTRIC GENERATION SYSTEM

(75) Inventors: Tatsuhiko Goi, Kobe (JP); Kenichiro Tanaka, Kobe (JP); Masahide Nakamura, Kakogawa (JP); Koji Watanabe, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 683 days.

(21) Appl. No.: 12/656,565

(22) Filed: Feb. 3, 2010

(65) Prior Publication Data

US 2010/0200692 A1 Aug. 12, 2010

(30) Foreign Application Priority Data

Feb. 6, 2009 (JP) .................................. 2009-26220

(51) Int. Cl.
*F16H 37/00* (2006.01)
(52) U.S. Cl.
USPC .................................. 476/33; 60/772; 60/793
(58) Field of Classification Search
USPC ....................... 476/33; 60/772, 793
See application file for complete search history.

(56) References Cited

U.S. PATENT DOCUMENTS

| 2004/0098988 A1* | 5/2004 | Goi ................................ 60/772 |
|---|---|---|
| 2006/0012180 A1 | 1/2006 | Hoppe et al. |

FOREIGN PATENT DOCUMENTS

| EP | 1 359 299 A1 | 11/2003 |
|---|---|---|
| JP | B2-3440287 | 6/2001 |
| JP | A-2008-038902 | 2/2008 |
| JP | A-2008-082208 | 4/2008 |
| JP | A-2008-239063 | 10/2008 |

OTHER PUBLICATIONS

Jul. 16, 2012 Extended European Search Report issued in European Application No. 10152779.4.
Sep. 14, 2010 Office Action issued in Japanese Patent Application No. 2009-026220 (with translation).
Dec. 7, 2010 Office Action issued in Japanese Patent Application No. 2009-026220 (with translation).
McClung, Richard C., "Constant Speed 400 Hz Aircraft Electric Generation System," Aerospace Meeting, Hyatt House (Airport), Los Angeles, Dec. 3-6, 1979, pp. 1-9.

\* cited by examiner

*Primary Examiner* — David M Fenstermacher
(74) *Attorney, Agent, or Firm* — Oliff & Berridge, PLC (57) ABSTRACT

This invention provides an aircraft electric generation system, which can achieve significantly increased capacity of electric generation, while adequately suppressing unwanted increase of a front face area of an aircraft engine as well as successfully dealing with considerably large changes of an engine spool speed. This electric generation system is driven by the engine and includes: a continuously variable transmission (CVT) connected with a rotation shaft of the engine; an electric generator located above the CVT and driven by an output of the CVT; and a lubricating oil pump unit located below the CVT and also driven by the output of the CVT.

6 Claims, 5 Drawing Sheets

AIRCRAFT ELECTRIC GENERATION SYSTEM

CROSS REFERENCE TO RELATED APPLICATIONS

This application is based upon the prior Japanese Patent Application No. 2009-26220 filed on Feb. 6, 2009, the entire contents of which are incorporated herein by reference.

BACKGROUND OF THE INVENTION

1. Field of the Invention

The present invention relates to an aircraft electric generation system adapted to be connected with an aircraft engine for driving an electric generator at a constant number of revolutions.

2. Background Art

Conventionally, the so-called IDG (Integrated Drive Generator)-type system has been known as a large-sized aircraft electric generation system. In general, the electric generation system of this type uses a continuously variable transmission (CVT) and is adapted for rotating the electric generator at the constant number of revolutions, irrespective of the number of revolutions of the engine (or engine speed), thus allowing the electric generator to generate electric power of a constant frequency. Further, as the IDG-type electric generation system, one system, which is composed of a continuously variable transmission (CVT) combined with a planetary gear transmission that can serve to compensate for relatively low mechanical efficiency of the continuously variable transmission (CVT), has been known. This system includes the so-called "Power-Split-Type Constant Speed Drive Unit," which is configured to split and share the driving power to be transmitted between the two transmissions, by using a power split shaft (see Patent Document 1).

By the way, as the aircraft engine, a two-shaft-type engine including a hollow high-pressure shaft connecting a compressor with a high-pressure turbine and a low-pressure shaft extending through the high-pressure shaft and connecting a fan with a low-pressure turbine has been well known. In the aircraft electric generation system including the power-split-type constant speed drive unit, the planetary transmission is operated at a fixed transmission gear ratio so that the transmission gear ratio of the entire constant speed drive unit is limited within a range of about 2:1 or less. Therefore, in the case of the aforementioned two-shaft-type engine, an input shaft of the constant speed drive unit is connected with the high-pressure shaft with less variation in the number of revolutions. Normally, the aircraft electric generation system is installed, together with a gear box, below the aircraft engine (see Non-patent Document 1).

Patent Document:
Patent Document 1: JP3440287B

Non-patent Document:
Non-patent Document 1: Richard C. McClung, "Constant Speed 400 Hz Aircraft Electric Generation System," Aerospace Meeting, Hyatt House (Airport), Los Angeles, Dec. 3-6, 1979

In general, the output of the conventional IDG-type electric generation system has been approximately 90 kVA. However, from recent marked increase of the number of various electric and electronic parts or units introduced into each aircraft body, it can be expected that the capacity of electric generation of such an aircraft is required to be greater than 200 kVA. However, in order to increase the electric generation capacity up to such a level (i.e., 200 kVA or higher), it is necessary to increase so much the size of each disk or the like of the continuously variable transmission (CVT), thus enlarging the size of the entire electric generation system. In particular, in the power-split-type electric generation system, the input shaft of the continuously variable transmission (CVT), a rotation shaft of the electric generator and the power split shaft are respectively arranged in parallel with one another, while constituting together a triangle, when seen in the axial direction of the shafts. Therefore, such arrangement of the shafts should occupy a considerably large space, causing the electric generation system itself to rather project or protrude downward from the aircraft engine. Of course, such arrangement of these shafts should increase the area of a front face of a nacelle covering both of the engine and electric generation system, thus also increasing the drag against the aircraft body so much. This is rather disadvantageous to the fuel consumption and emission efficiency.

Besides, in the case in which the electric generation system is connected with the high-pressure shaft of the aircraft engine and if the total electric load of the aircraft is increased greater than 200 kVA, there is a risk that some serious engine operability problem would occur. However, if the electric generation system is connected with the low-pressure shaft that has no limitation on power extraction, it would be quite difficult to control the electric generator to be rotated, at a constant speed, within the transmission gear ratio of 2:1 or less, because of rather great variation in the number of revolutions of the low-pressure shaft.

SUMMARY OF THE INVENTION

Therefore, it is an object of this invention to provide a new aircraft electric generation system, which can achieve significantly increased capacity of the electric generation, while adequately suppressing unwanted increase of the front face area of the aircraft engine as well as successfully dealing with considerably large changes of the shaft speed variation.

In order to achieve the above object, the aircraft electric generation system according to the present invention is adapted to be driven by an aircraft engine, including: a continuously variable transmission (CVT) connected with a rotation shaft of the aircraft engine; an electric generator configured to be driven by an output of the continuously variable transmission (CVT); and a lubricating oil pump unit configured to be driven by the output of the continuously variable transmission (CVT), wherein the continuously variable transmission (CVT), the electric generator and the lubricating oil pump unit are arranged in a vertical direction.

According to the aircraft electric generation system of the present invention, the planetary-gear transmission has been eliminated and the continuously variable transmission (CVT), electric generator and oil pump unit are respectively arranged in the vertical direction. This structure can achieve a significantly thin and elongated slim shape of the aircraft electric generation system on the whole, thus allowing good attachment of the system to a side face of the aircraft engine, with the projection or protrusion of the system from the side face being well lessened. Therefore, even in the case in which the size of each disk constituting the continuously variable transmission (CVT) is considerably enlarged in order to provide significantly increase the electric generation capacity, the unwanted increase of the drag against the aircraft body can be adequately suppressed, while successfully avoiding undue degradation of the fuel consumption efficiency. Besides, the use of the continuously variable transmission (CVT) in this electric generation system can successfully deal with relatively great changes of the shaft speed variation, thus allowing the electric generation capacity to be significantly increased, even in the case in which the continuously variable transmission (CVT) is connected with, for example, the low-pressure shaft which tends to generate rather great variation in the number of revolutions.

In this embodiment, it is preferred that respective axes of the electric generator, the continuously variable transmission (CVT) and the lubricating oil pump unit extend in parallel with one another and are positioned on an arcuate arrangement line when seen in an axial direction of the continuously variable transmission (CVT). With this configuration, when the electric generation system is attached to the side portion of the aircraft engine, the arcuate arrangement line can be well fitted along a curved shape of the side face of the engine. Therefore, the projection or protrusion of the outer shape of the electric generation system from the side face of the aircraft engine can be adequately suppressed, as such positively controlling the increase of the front face area of the nacelle for covering the aircraft engine.

In the configuration of the above three axes respectively positioned on the arcuate arrangement line, it is preferred that the aircraft electric generation system further includes an idler shaft configured to connect the continuously variable transmission (CVT) with the electric generator, the idler shaft including a first intermediate gear configured to be meshed with an output gear of the continuously variable transmission (CVT) and a second intermediate gear configured to be meshed with an input gear of the electric generator. With this configuration, the number of revolutions of the continuously variable transmission (CVT) can be increased, in a two-step manner, by selectively setting the gear ratio between the output gear of the continuously variable transmission (CVT) and the first intermediate gear as well as setting the gear ratio between the second intermediate gear and the input gear of the electric generator. Therefore, even in the case of using relatively small-sized first and second intermediate gears, the output of the continuously variable transmission (CVT) can be transmitted to the electric generator, after the number of revolutions of the output is increased up to a predetermined number, thereby providing desirably increased electric generation capacity. Namely, the rotation speed of the continuously variable transmission (CVT) can be well increased during the electric generation, with the mechanical torque of the system adequately reduced. Besides, this configuration can positively control undue increase of the size and weight of the entire electric generation system.

In the configuration including the idler shaft, it is preferred that an axis of the idler shaft is positioned inside relative to the arcuate arrangement line. With such configuration, the axis of the idler shaft is located nearer to the axis of the engine, as compared with the electric generator, continuously variable transmission (CVT) and oil pump unit, each having the axis positioned on the aforementioned arcuate arrangement line. Therefore, the size, especially in the vertical direction, of the entire system can be successfully reduced.

In this invention, it is preferred that the electric generation system further includes a case configured to store therein the continuously variable transmission (CVT), the electric generator and the oil pump unit, wherein an oil reservoir for storing lubricating oil therein is provided at a bottom portion of the case, and wherein the electric generator is located above the continuously variable transmission (CVT) and the oil pump unit is located below the continuously variable transmission (CVT). With this configuration, the positioning of the oil pump unit below the continuously variable transmission (CVT) can allow the lubricating oil to be smoothly drawn from the oil reservoir provided at the bottom portion of the case and efficiently supplied to each object to be lubricated. Meanwhile, the electric generator located above the continuously variable transmission (CVT) can securely avoid being immersed in the lubricating oil stored below the continuously variable transmission (CVT). Thus, even in the case of considerably increasing the number of revolutions of the electric generator, a loss of the lubricating oil caused by stirring or vibration due to the actuation of the electric generator can be well reduced.

In this invention, it is preferred that the oil pump unit includes an oil scavenge pump and an oil supply pump, respectively arranged on a single pump axis extending in parallel with an axis of the continuously variable transmission (CVT). With such configuration, the arrangement of the oil scavenge pump and oil supply pump on the single axis can securely reduce the size of the system in the direction orthogonal to the axis of the two pumps. Thus, the front face area of the electric generation system and/or nacelle can be significantly reduced, thereby substantially suppressing the drag against the system and/or nacelle.

As described above, this invention can provide the aircraft electric generation system having the slim body of the significantly thin and elongated shape on the whole. In other words, the shape of the aircraft electric generation system achieved by this invention can provide highly good attachment of the system to the side face of the aircraft engine, while adequately suppressing the unwanted projection or protrusion of the system from the side face. This can prevent undue increase of the drag against the aircraft body, while positively avoiding degradation of the fuel consumption efficiency. Besides, this electric generation system can achieve the significantly increased electric generation capacity, while successfully dealing with the changes of the shaft speed variation.

BRIEF DESCRIPTION OF THE DRAWINGS

The present invention will be understood more apparently from the following descriptions on an embodiment, with reference to the attached drawings. However, such descriptions and drawings for this embodiment are respectively provided herein by way of example, and not intended in any way to limit the scope of this invention. Namely, the scope of this invention is limited by the appended claims. It is noted that like reference numerals given in the drawings will designate like or equivalent part or elements, respectively.

DETAILED DESCRIPTION OF THE INVENTION

Hereinafter, a preferred embodiment of the present invention will be described with reference to the drawings.

Figure 1:
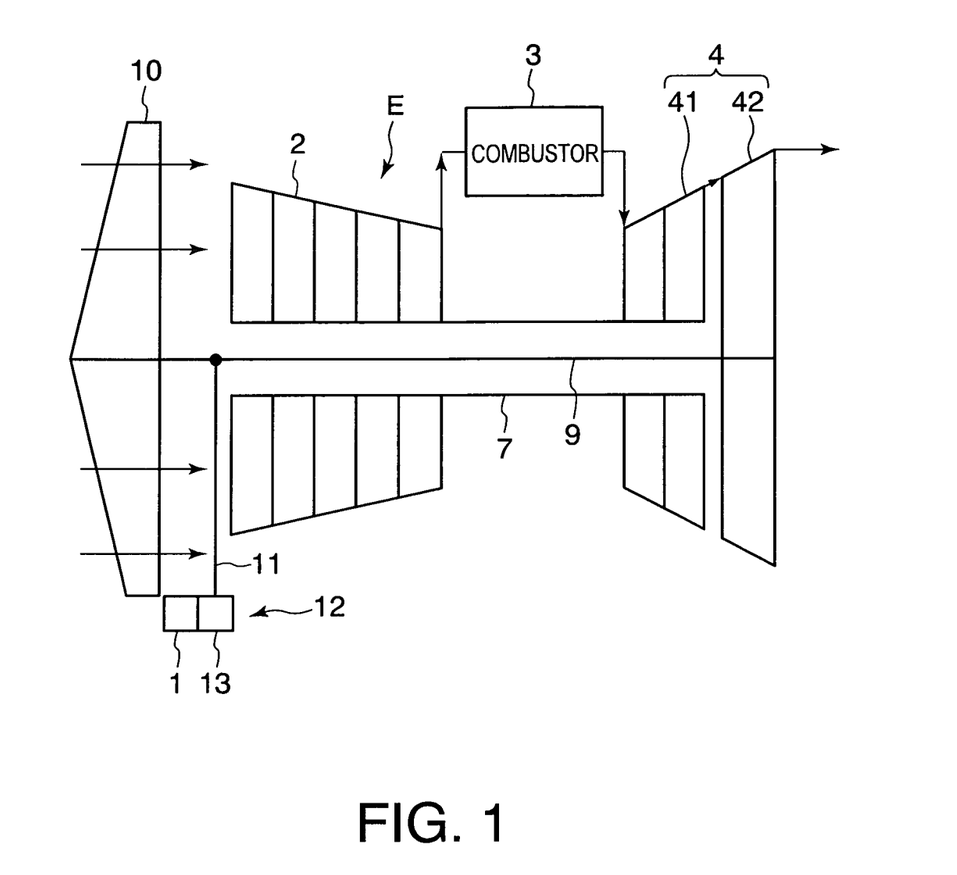
FIG. 1 is a schematic side view illustrating a connection state in which the aircraft electric generation system related to the embodiment of the present invention is connected with the engine.

As shown in FIG. 1, the engine E is composed of a two-shaft-type fan engine, and includes the compressor 2, a combustor 3, a turbine 4 and a fan 10, as main components thereof. In this case, compressed air supplied from the compressor 2 is first combusted by the combustor 3, and a high-temperature and high-pressure combustion gas generated by the combustion is then supplied to the turbine 4. The turbine 4 includes a high-pressure turbine 41 located on a pre-stage and a low-pressure turbine 42 located on a post-stage. The compressor 2 is connected with the high-pressure turbine 41 via the hollow high-pressure shaft 7, and is rotated by the high-pressure turbine 41. The fan 10 is connected with the low-pressure turbine 42 via the low-pressure shaft 9 extending through the hollow portion of the high-pressure shaft 7, and is rotated by the low-pressure turbine 42. With this configuration, engine thrust can be obtained both by a jet stream of the combustion gas injected from the low-pressure turbine 42 and by a high-speed air stream produced by the fan 10.

Further, one end of a connection shaft 11 is connected with one end of the low-pressure shaft 9, on the back side of the fan 10, via a bevel gear (not shown), while the other end of the connection shaft 11 is connected with the gear box 13 of an auxiliary machine 12. Additionally, in this aircraft electric generation system 1 related to this embodiment, a transmission input shaft, which will be described later, is connected with the gear box 13, so that the rotation of the low-pressure shaft 9 can be transmitted to the transmission input shaft via the gear box 13. Namely, unlike the conventional aircraft electric generation system using the high-pressure shaft 7 as the rotation shaft of the engine E for driving the electric generation system 1, this embodiment uses the low-pressure shaft 9 as the rotation shaft for driving the electric generation system 1.

Figure 2:
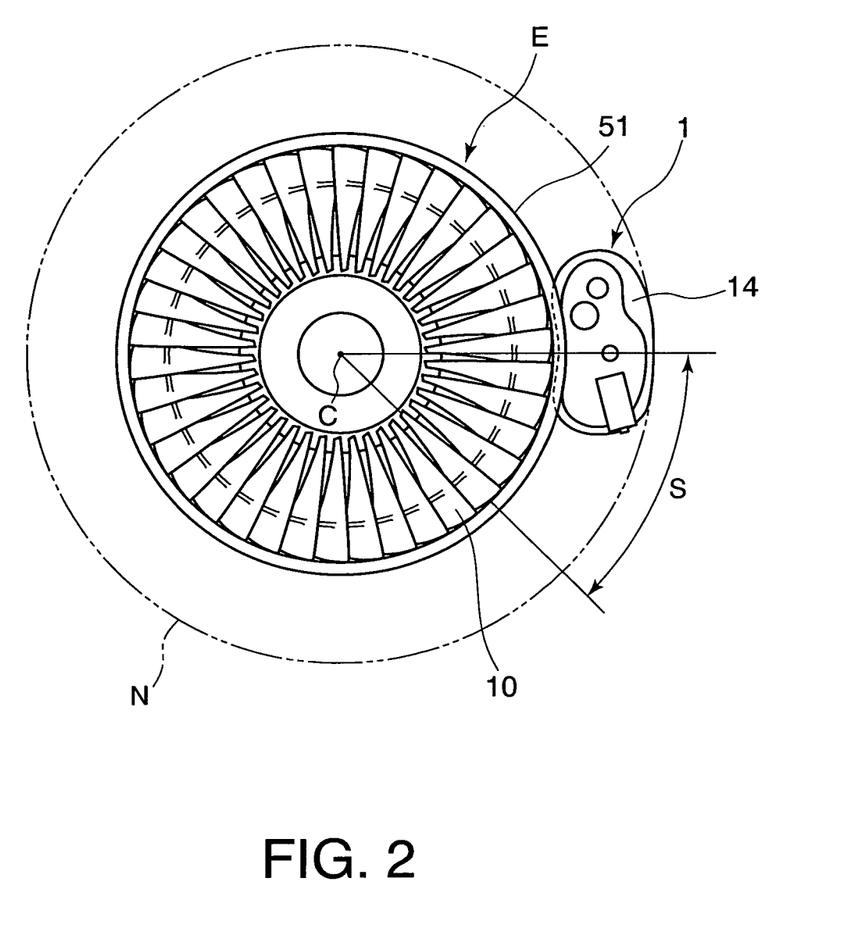
FIG. 2 is a front view illustrating an attachment state in which the aircraft electric generation system shown in FIG. 1 is attached to the engine.
Figure 3:
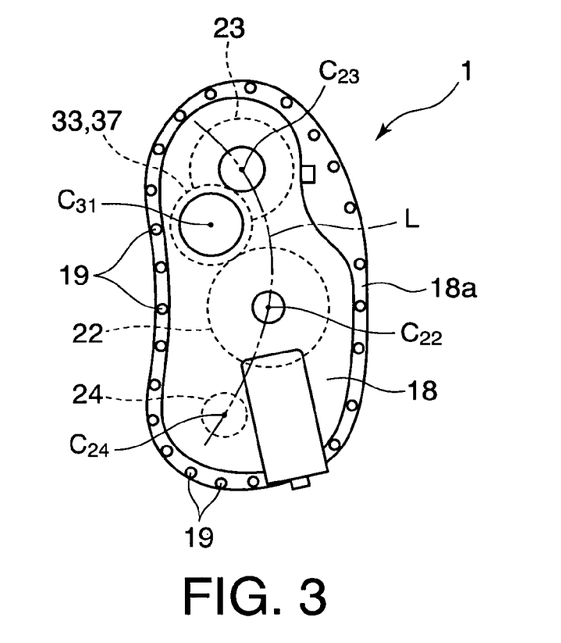
FIG. 3 is a front view of the aircraft electric generation system shown in FIG. 1.
Figure 4:
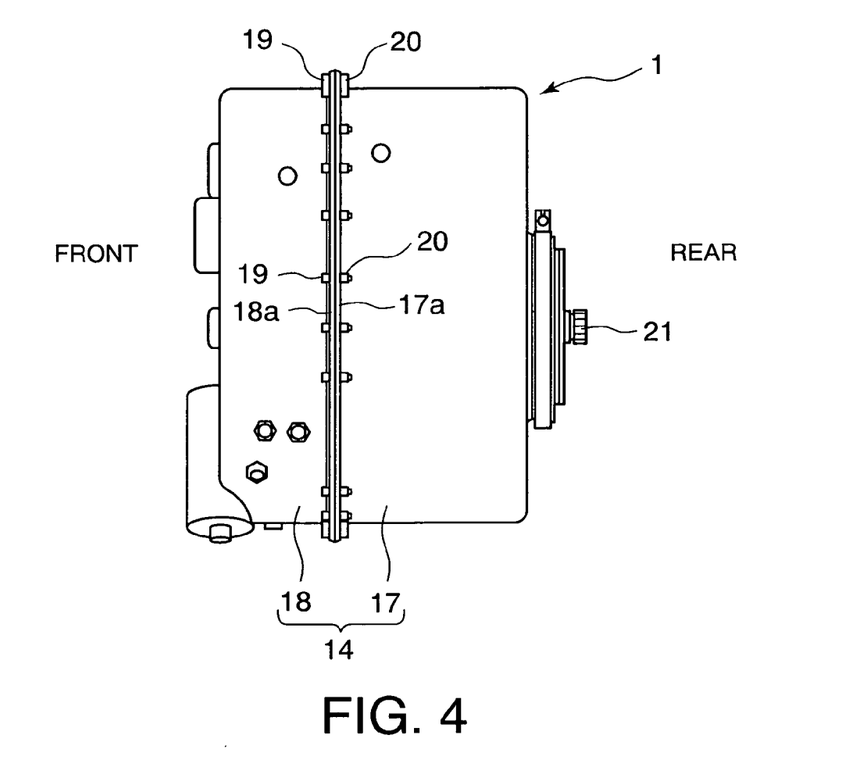
FIG. 4 is a side view of the aircraft electric generation system shown in FIG. 1.

In the front view of FIG. 2 illustrating the attachment of the electric generation system 1 to the engine E, the aircraft electric generation system 1 is attached to a side portion of the engine E. FIGS. 3 and 4 are exemplary front and right-side views, respectively showing the electric generation system 1. As apparently shown in FIG. 3, when seen in a front direction along an axis C of the engine E, the electric generation system 1 is of a thin-type, having an outer shape of a relatively small size in a width direction thereof, while being elongated in a vertical direction thereof. Thus, the electric generation system 1 can be attached to the side portion of the engine E, as shown in FIG. 2, while the projection or protrusion of the system 1 from the side face of the engine E can be well lessened. In use, both of the engine E and electric generation system 1 are covered with an engine nacelle N. As shown in FIG. 4, the case 14 defining the outer shape of the electric generation system 1 is composed of two divided case halves 17, 18. These case halves 17, 18 are fastened together by bolts 19 and nuts 20, with each flange 17a, 18a thereof joined together.

The electric generation system 1 is located in front of the gear box 13 configured to be driven together with the low-pressure shaft 9, i.e., one of the rotation shafts provided in the two-shaft-type engine E shown in FIG. 1. Specifically, as shown in the vertical section of FIG. 5, the electric generation system 1 includes the transmission input shaft 21 connected with one output shaft of the gear box 13, the continuously variable transmission 22 connected with the transmission input shaft 21, the electric generator 23 located above the continuously variable transmission (CVT) 22 and configured to be driven with the output of the continuously variable transmission 22, and the lubricating oil pump unit 24 located below the continuously variable transmission 22 and configured to be driven with the output of the continuously variable transmission 22. The continuously variable transmission 22, electric generator 23 and oil pump unit 24 are stored in the case 14, respectively. It is noted that the electric generation system 1 may be located on the back side of the gear box 13 shown in FIG. 1.

Figure 5:
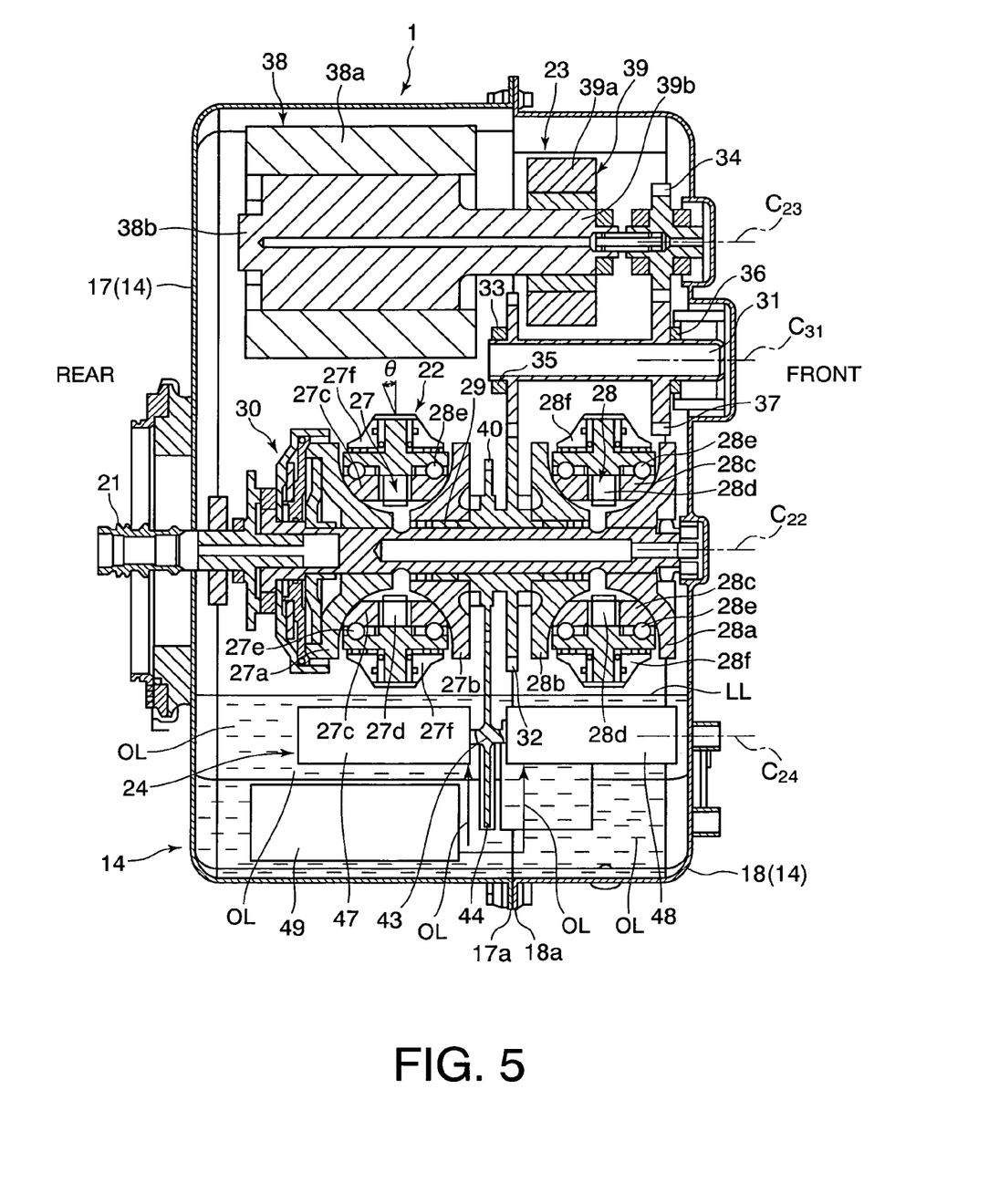
FIG. 5 is a vertical section of the aircraft electric generation system shown in FIG. 1.

The continuously variable transmission 22 of this embodiment as shown in FIG. 5 is a half-toroidal traction-drive transmission unit of the so-called double cavity type having two, i.e., first and second, cavities 27, 28 respectively arranged along the transmission input shaft 21 with a predetermined interval. In this unit, first and second input disks 27a, 28a are provided axially outside the two cavities 27, 28, respectively. In addition, first and second output disks 27b, 28b are provided axially inside the cavities 27, 28, respectively. Further, a transmission output shaft 29 is fitted concentrically around the transmission input shaft 21. In this case, the two input disks 27a, 28a are connected together via the transmission input shaft 21, while the two output disks 27b, 28b are connected together via the transmission output shaft 29. Namely, in this embodiment, the constant-speed drive unit can be achieved by using only the continuously variable transmission 22, without employing the aforementioned power-split-type constant speed drive unit having the power split shaft.

A first power roller 27c is provided between the first input disk 27a and the first output disk 27b in the forward first cavity 27, while a second power roller 28c is provided between the second input disk 28a and the second output disk 28b in the backward second cavity 28. In addition, an axial force generating mechanism 30 adapted for generating force for pressing the respective power rollers 27c, 28c is provided in front of the input disk 27a.

The power rollers 27c, 28c are supported by thrust bearings 27e, 28e and trunnions 27f, 28f (well-known support members), such that the rollers 27c, 28c can be rotated about roller shafts 27d, 28d as well as rotated obliquely in a plane including the roller shafts 27d, 28d and transmission input shaft 21, respectively. Additionally, in the respective cavities 27, 28, the three kinds of rolling elements, i.e., the input disks 27a, 28a, output disks 27b, 28b and power rollers 27c, 28c, are pushed, respectively, against one another, with the axial force applied from the axial force generating mechanism 30, so that the power can be transmitted to each rolling element, due to shearing resistance of a highly viscous film of the lubricating oil created at each contact portion between the respective elements. Namely, the transmission of the driving power between the first input disk 27a and the first output disk 27b can be achieved by fluid friction generated between these disks 27a, 27b and the first power roller 27c located between the two disks 27a, 27b. Meanwhile, the transmission of the driving power between the second input disk 28a and the second output disk 28b can be attained by the shear resistance of the fluid generated between these disks 28a, 28b and the second power roller 28c located therebetween.

With proper control of an oblique rotation angle (θ), i.e., the inclination of each power roller 27, 28c, by using an appropriate control mechanism, the acceleration ratio and deceleration ratio, i.e., the transmission gear ratio, can be optionally altered. For instance, the transmission gear ratio can be optionally altered within a predetermined range, e.g., 0.5 to 2.0. This range can also be expressed by the deceleration ratio of 4:1 or less. However, if required, this range may be 5:1 or less, or otherwise may be any other suitable range.

An idler shaft 31 is provided between the continuously variable transmission 22 and the electric generator 23, for connecting these units 22, 23 via gears. More specifically, a first intermediate gear 33 meshed with a first output gear 32 of the continuously variable transmission 22 is provided in the vicinity of one end of the idler shaft 31, while a second intermediate gear 37 meshed with an input gear 34 of the electric generator 23 is provided in the vicinity of the other end of the idler shaft 31. The respective ends of the idler shaft 31 are supported by the case 14 via bearings 35, 36. With such configuration, the number of revolutions of the continuously variable transmission 22 can be increased, in the two-step manner, by selectively setting the gear ratio between the first output gear 32 of the continuously variable transmission 22 and the first intermediate gear 33 as well as setting the gear ratio between the second intermediate gear 37 and the input gear 34 of the electric generator 23.

The electric generator 23 includes a main electric generator 38 and an auxiliary electric generator 39. In this case, an alternating current is generated in a rotor 39b of the auxiliary electric generator 39, by supplying an exciting current to a stator 39a of the auxiliary electric generator 39. This alternating current is then commutated in order to supply a direct current to a rotor 38b of the main electric generator 38. Thus, electric power can be taken out from the stator 38a of the main electric generator 38 with the rotation of the rotor 38b. The amount of the generated electric power can be optionally set by selectively adjusting the exciting current supplied to the stator 39a of the auxiliary electric generator 39. When rotated by the engine E via the continuously variable transmission 22, the electric generator 23 can be operated as an electric generation unit, thereby supplying the electric power to various electric loads, such as lighting, air conditioning, anti-icing equipment and the like, respectively provided in each aircraft.

The rotation speed of the transmission output shaft 29 of the continuously variable transmission 22 can be kept constant, by properly changing the respective oblique rotation angles (θ) of the power rollers 27c, 28c of the continuously variable transmission 22, while keeping the relationship between the two angles (θ), depending on changes of the rotation speed of the transmission input shaft 21. Namely, by controlling the CVT gear ratio to cancel the variation in the number of revolutions of the transmission input shaft 21 by using the continuously variable transmission 22, the rotational speed of the transmission output shaft 29 can be kept constant. Then, once increased or accelerated by the idler shaft 31, the constant rotation speed of the transmission output shaft 29 is transmitted to the electric generator 23. As such, the electric generator 23 can be rotated, at a high speed, with the constant number of revolutions, and hence generate desired alternating electric power at a constant frequency.

A second output gear 40 provided to the transmission output shaft 29 of the continuously variable transmission 22 is meshed with a pump input gear 44 provided to a single pump rotation shaft 43 of the oil pump unit 24. One end of the pump rotation shaft 43 is coaxially connected with a lubricating oil scavenge pump 47, while the other end of the pump rotation shaft 43 is coaxially connected with a lubricating oil supply pump 48. Further, a centrifugal air separator 49 adapted for separating air from the lubricating oil is located below the oil scavenge pump 47. A bottom portion of the case 14 is used as an oil reservoir 15 for storing the lubricating oil OL therein. Usually, the level of the oil surface LL is set above the oil pump unit 24, thus the oil pump unit 24 is immersed in the oil stored in the oil reservoir 15. With this oil pump unit 24, the lubricating oil OL stored or accumulated in the bottom portion of the case 14 is once drawn up by actuation of the oil scavenge pump 47, and then fed to the oil supply pump 48, with the air in the lubricating oil OL separated and removed therefrom by the air separator 49. Thereafter, the oil OL is fed from the oil supply pump 48 to respective parts to be lubricated, such as the electric generator 23, continuously variable transmission 22 and the like. After lubricating such parts, the lubricating oil OL is returned, for circulation, by the gravity, to the oil reservoir 15 located at the bottom of the case 14.

Next, the operation of the aircraft electric generation system 1 of this embodiment will be described. First, the rotation of the low-pressure shaft 9 of the engine E shown in FIG. 1 is transmitted to the electric generation system 1 via the connection shaft 11 and gear box 13. Then, in the electric generation system 1, the driving power is transmitted from the transmission input shaft 21 to the electric generator 23 via the continuously variable transmission 22 and idler shaft 31, so that the electricity can be generated by the rotation of the electric generator 23.

Figure 6:
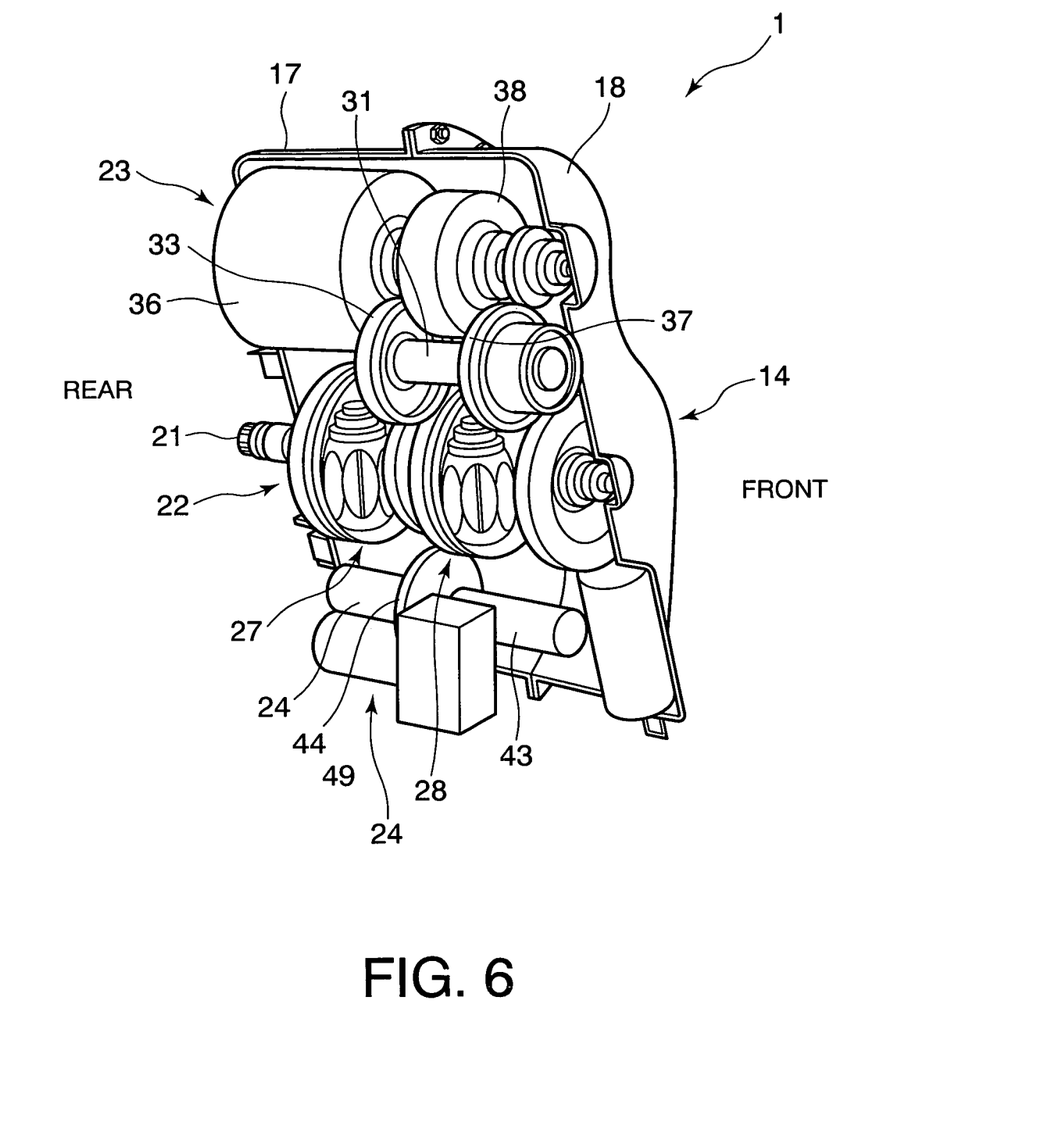
FIG. 6 is a front perspective view illustrating a structure in a case of the aircraft electric generation system shown in FIG. 1.

As described above, the case 14 of the aircraft electric generation system 1 of this embodiment is divided into the two halves 17, 18, and has a considerably thin and elongated outer shape. As shown in FIG. 6, all of the components, such as the continuously variable transmission 22, electric generator 23, oil pump unit 24 and the like, are stored in the case 14 in a compact form. Such a compact form can be achieved by the following configuration and arrangement. First, as shown in FIG. 5, the continuously variable transmission 22, electric generator 23 and oil pump unit 24 are respectively arranged, with their three axes extending in parallel relative to one another, wherein the electric generator 23 is located above the continuously variable transmission 22, while the oil pump unit 24 is located below the continuously variable transmission 22. Second, as shown in FIG. 3, each of the axes C23, C22, C24 of the electric generator 23, continuously variable transmission 22 and oil pump unit 24, respectively arranged in parallel with one another, extends in parallel with the axis C (see FIG. 2) of the engine E, when seen in the axial direction of the continuously variable transmission 22, while being located on the arcuate arrangement line L running substantially concentrically with respect to the axis C.

Therefore, the outer shape of the electric generation system 1 can achieve significantly good attachment of this system 1 to the side face 51 of the engine E, as shown in FIG. 2, while the projection or protrusion of this system 1 from the side face 51 can be successfully reduced. Further, the electric generation system 1 can be attached to the side face 51 of the engine E, with the aforementioned arcuate arrangement line L running substantially along the curved side face 51. Thus, the nacelle N used for covering the engine E can be shaped to effectively and substantially suppress unwanted increase of the front face area.

Additionally, in the electric generation system 1, the number of revolutions of the continuously variable transmission 22 shown in FIG. 5 can be increased, in the two-step manner, by selectively setting the gear ratio between the first output gear 32 of the continuously variable transmission 22 and the first intermediate gear 33 of the idler shaft 31 as well as setting the gear ratio between the second intermediate gear 37 of the idler shaft 31 and the input gear 34 of the electric generator 23. Therefore, even though the relatively small-sized first and second intermediate gears 33, 37 are used, this configuration of the system 1 can securely increase the number of revolutions of the continuously variable transmission 22, for example, from approximately 10,000 rpm up to 24,000 rpm, in order to rotate the electric generator 23, thus readily accommodating a relatively large electric generation capacity that can provide a desired output greater than 200 kVA. Besides, this arrangement for increasing the number of revolutions of the continuously variable transmission 22 while reducing the mechanical torque can positively suppress unwanted increase of the size and weight of the entire electric generation system 1. In addition, as shown in FIG. 3, the axis C31 of the idler shaft 31 extends inside the aforementioned arrangement line L. Namely, the axis C31 is located nearer to the axis C of the engine E, as compared with the arrangement line L. Therefore, a space provided between the electric generator 23 and the continuously variable transmission 22 and located inside the arrangement line L can be effectively utilized, thereby successfully controlling the increase of the size in the vertical direction of the electric generation system 1.

In this embodiment, as shown in FIG. 5, since the oil pump unit 24 is located at the bottom portion of the case 14, while being immersed in the oil reservoir 15, the lubricating oil OL can be drawn smoothly from the oil reservoir 15 provided at the bottom portion of the case 14 and supplied to each object to be lubricated. For instance, even when the attitude of the aircraft body is considerably changed, such smooth supply of the lubricating oil OL can be maintained adequately. In addition, the provision of the electric generator 23 above the continuously variable transmission 22 can securely prevent the electric generator 23 from being inadvertently immersed in the lubricating oil OL stored in the oil reservoir 15 provided below the continuously variable transmission 22. Therefore, even if the number of revolutions of the electric generator 23 is considerably increased, the loss of lubricating oil OL caused by stirring, vibration or the like, due to the high-speed rotation of the electric generator 23, can be well controlled.

Because the oil scavenge pump 47 and oil supply pump 48 constituting together the oil pump unit 24 respectively have the single pump axis C24 extending parallel with the axis C22 of the continuously variable transmission 22, the size in the direction orthogonal to the axis C24 of the two pumps 47, 48 can be well reduced. Therefore, the area of the front face of the electric generation system 1 can be lessened so much, thereby positively suppressing unwanted increase of the drag.

Additionally, since the electric generation system 1 of this embodiment is provided as the constant speed drive unit or mechanism configured for transmitting the rotation of the engine E to the electric generator 23 via only the continuously variable transmission 22, without utilizing the power-split mechanism, the maximum transmission gear ratio of the continuously variable transmission 22 can be set at approximately 5:1. Thus, the electric generator 23 can be rotated at a constant speed, even though the electric generator 23 is connected, via the gear box 13, to the low-pressure shaft 9 (shown in FIG. 1) that may tend to generate relatively large fluctuation of the engine E. Furthermore, unlike the high-pressure shaft 11, the low-pressure shaft 9 has no limitation on power extraction of the auxiliary machine 12. Therefore, the electric generation capacity can be adequately increased by providing relatively large-sized disks 27a, 27b, 28a, 28b in the continuously variable transmission 22, as shown in FIG. 5. In this way, the electric generator 23 can be rotated at a significantly high speed, by selectively increasing the rotation speed of the continuously variable transmission 22 by using the idler shaft 31, so that the substantial reduction of the mechanical torque can securely avoid undue increase of the size and weight of the system.

It is noted that the electric generator 23, continuously variable transmission 22 and oil pump unit 24 only need to be arranged in the vertical direction. Namely, it is not necessary to arrange these units, in this order, from the top. For instance, the oil pump unit 24, electric generator 23 and continuously variable transmission 22 may be arranged, in this order, from the top. In this case, the oil reservoir 15 and oil pump unit 24 are connected with each other via a proper pipe. The electric generator 23 is located above the continuously variable transmission 22, while being upwardly spaced away from the oil reservoir 15. Therefore, the loss of lubricating oil OL in the oil reservoir 15 caused by stirring or the like can well be reduced.

In the above embodiment, the case, in which the half-toroidal traction-drive transmission system of the so-called double cavity type is used as the continuously variable transmission 22, has been described and shown by way of example. However, the toroidal traction-drive transmission system of the so-called single cavity type having a single cavity and/or full-toroidal traction-drive system can also be used as the continuously variable transmission 22. Further, in the above embodiment, the attachment position of the electric generation system 1 to the engine E has been described as the side portion of the engine E. However, as shown in FIG. 2, the electric generation system 1 may be attached within a range S of from a horizontal line corresponding to the level of the axis of the engine E to a position angularly spaced, by approximately 45°, from the axial level of the engine E. With such attachment of the electric generation system 1, the lubricating oil OL can be smoothly circulated, even when the aircraft attitude is considerably changed.

It should be construed that various addition, alteration and deletion can be made to the above embodiment without departing from the gist of this invention, and hence it should be considered that such addition, alteration and deletion also fall within the technical scope of this invention.

The invention claimed is:

1. An aircraft electric generation system which is adapted to be driven by an aircraft engine, the aircraft electric generation system comprising:
   a continuously variable transmission connected with a rotation shaft of the aircraft engine;
   an electric generator configured to be driven by an output of the continuously variable transmission; and
   a lubricating oil pump unit configured to be driven by the output of the continuously variable transmission, wherein
      the continuously variable transmission, the electric generator and the lubricating oil pump unit respectively include axes that are: i) substantially parallel to an axis of the aircraft engine, and ii) arranged in a vertical direction, and
      the vertical direction is substantially perpendicular to the axes so as to overlap with each other when viewed in a direction substantially perpendicular to the axes.

2. The aircraft electric generation system according to claim 1, wherein the axes of the electric generator, the continuously variable transmission and the lubricating oil pump unit are positioned on an arcuate arrangement line when viewed in an axial direction of the continuously variable transmission.

3. The aircraft electric generation system according to claim 2, further comprising:
   an idler shaft configured to connect the continuously variable transmission with the electric generator, the idler shaft including a first intermediate gear configured to be meshed with an output gear of the continuously variable transmission and a second intermediate gear configured to be meshed with an input gear of the electric generator.

4. The aircraft electric generation system according to claim 3, wherein an axis of the idler shaft is positioned inside relative to the arcuate arrangement line.

5. The aircraft electric generation system according to claim 1, further comprising:
   a case configured to store therein the continuously variable transmission, the electric generator and the lubricating oil pump unit, and an oil reservoir configured to store therein lubricating oil, the oil reservoir being provided at a bottom portion of the case, wherein the electric generator is located above the continuously variable transmission and the lubricating oil pump unit is located below the continuously variable transmission.

6. The aircraft electric generation system according to claim 1, wherein the lubricating oil pump unit includes an oil scavenge pump and an oil supply pump, respectively arranged on a single pump axis extending in parallel with an axis of the continuously variable transmission.

* * * * *